R. S. MENNIE.
STAY BOLT.
APPLICATION FILED MAY 18, 1914. RENEWED MAR. 22, 1918.
1,288,955. Patented Dec. 24, 1918.
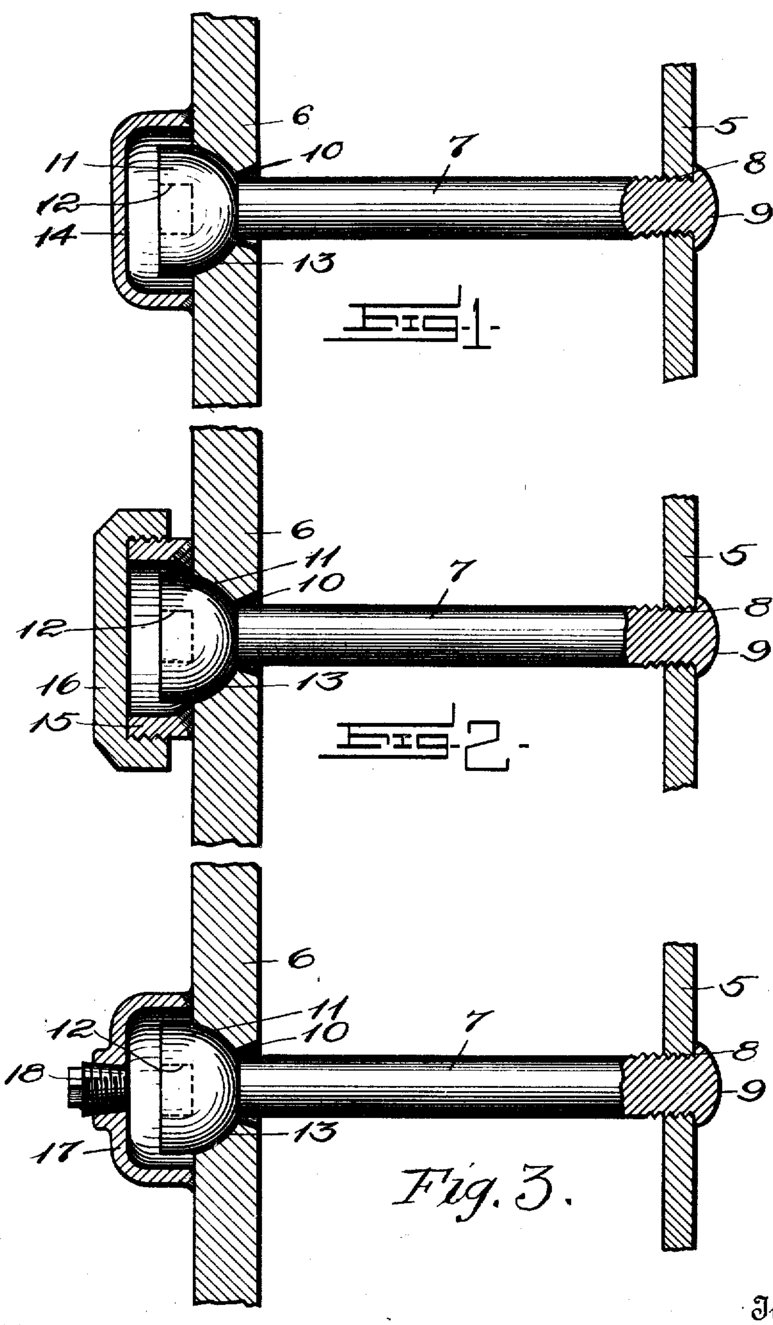
Witnesses
Margery C. Lucas
E. Larson
Inventor
Robert S. Mennie.
By Milo B. Stevens & Co.
Attorneys

UNITED STATES PATENT OFFICE.

ROBERT S. MENNIE, OF CHICAGO, ILLINOIS.

STAY-BOLT.

1,288,955. Specification of Letters Patent. Patented Dec. 24, 1918.

Application filed May 18, 1914, Serial No. 839,314. Renewed March 22, 1918. Serial No. 224,077.

*To all whom it may concern:*

Be it known that I, ROBERT S. MENNIE, a citizen of the United States, residing at Chicago, in the county of Cook and State of Illinois, have invented certain new and useful Improvements in Stay-Bolts, of which the following is a specification.

My invention relates to improvements in stay bolts, particularly those used in locomotive boiler construction.

In such constructions there is a relative movement between the outside sheet and the inside sheet which sheets are spaced only a few inches apart in certain places. The stay bolts, therefore, must permit this relative movement in addition to preventing spreading of said sheets due to the pressure developed.

As heretofore constructed, such stay bolts as have gone into general commercial use, provide a ball and socket joint, the socket being formed in a sleeve which is screw-threaded into an opening in the sheet. The sleeve is provided with a cap to prevent leakage of the water which fills the space between the sheets or of the steam above the water level.

The operation of drilling and tapping the holes in the outside sheets is expensive, as is also the sleeve itself, and since the stay bolts are fairly close together, an unnecessarily large amount of material is removed to provide room for the sleeve between the bolt and the walls of said opening.

One of the objects of the present invention is to provide a practical construction wherein a cap may be employed for the head of the stay bolt in conjunction with an opening in the outer sheet just large enough to accommodate the shank of said bolt whereby the objectionable larger openings referred to are avoided.

Another object is to provide a construction wherein the screw-threading of the opening is dispensed with.

A further object is to provide a construction wherein the head of the stay bolt is inclosed in a cap which is welded to the outer sheet, whereby a permanently tight joint is secured.

An additional object is to provide a cap of this character having a removable portion to expose the head of the stay bolt.

Other objects and advantages will be apparent from the subsequent description of the several embodiments of the invention illustrated herein.

In the drawing—

Figure 1 is a sectional view showing one embodiment of the invention, and

Figs. 2 and 3 are similar views showing modifications.

In each figure of the drawing, 5 and 6 denote the walls of a boiler fire-box or similar structure to which the stay bolt 7 is applied. The bolt is threaded at one end, as indicated at 8, to screw into a threaded opening in the wall 5, and its protruding end is spread, as indicated at 9. The other end of the bolt passes loosely through an opening 10 in the wall 6, and said end has an enlarged head 11 with a spherical bearing surface. The outer face of the head is preferably flat and has a socket 12 to receive a suitable tool whereby the bolt may be screwed into the threaded opening in the wall 5.

The opening 10 is flared inwardly to allow lateral play of the bolt 7 and its outer end is enlarged to form a seat 13 for the head 11, said seat conforming to the contour of the head to permit pivotal movement of the bolt.

In order to prevent leakage around the bolt head 11, a cap or housing 14 is welded to the wall 6, on the outside thereof by the autogenous or other welding process, to inclose the protruding portion of the bolt head, whereby leakage is effectually prevented without affecting the freedom of movement or flexibility of the bolt. The bolt head seats directly in the wall 6 without the interposition of sleeves or bushings of any kind, and as the cap 14 is welded on, a threaded opening need not be made in the wall 6 to hold the cap. The opening through which the bolt passes and in which its head seats need be only large enough to accommodate said parts, in view of which the wall is not necessarily weakened.

The inner sheet 5 and the outer sheet 6 are spaced several inches apart in practice, sheet 5 constituting the wall of the fire-box and the outer sheet being accessible, thereby permitting inspection, etc. The space between the sheets is filled with water up to a certain level under the usual boiler pressure. The stay bolts are designed to prevent the sheets from moving apart under said pressure. It will be seen that a certain relative movement of either sheet in its own plane is permitted without diminishing the effectiveness of the stay bolt. What little leakage of water does occur through the ball and socket joint does not result in loss of water from the boiler because of the welded cap. If a stay bolt breaks, the cap may be chipped off readily and a new stay bolt substituted for the broken one, after which a new cap may be welded in place.

Fig. 2 shows a circular member nipple or sleeve 15 welded to the wall 6 on the outside thereof to encircle the protruding portion of the bolt head 11. This nipple is externally screw-threaded to receive a cap or cover in the form of a cap nut 16. This structure or housing also provides an inclosure for the bolt head to prevent leakage around the same without affecting the flexibility of the bolt, and enables the bolt to be replaced without removing the welded inclosure.

Fig. 3 shows a cap or housing 17 similar to the cap 14, but it is provided at the center with a screw-threaded opening to receive a closure in the form of a screw plug 18 which is removable to permit inspection of the stay bolt head.

It will be noted that the bolt head 11 does not extend outward as far as the outer end of the cap or the nipple, whereby said bolt head is spaced from the outer end of the cap so that the pivotal movement of the bolt is not interfered with.

It is obvious that certain features disclosed in connection with one figure may be employed in connection with features disclosed in the other figures and that in all three forms of device, a cap or inclosure is formed for the head of the bolt, said inclosure being preferably, but not necessarily, a circular member having an outer wall which in Fig. 1 is integral, in Fig. 2 is removable as an entirety, and in Fig. 3 is removable only in part. Various forms of devices, other than those disclosed or suggested herein, may be devised which fall within the spirit of the invention as defined in the appended claims.

I claim:

1. The combination with an outer and an inner sheet, of a stay bolt passing through alined openings in said sheets, said stay bolt having an enlarged head which, with the walls of the adjacent opening, forms a ball and socket joint, and a cap inclosing said head and butt-welded to said outer sheet.

2. In a stay bolt construction, the combination with a boiler wall having an opening therein, of a cap having a continuous edge abutting against said wall, surrounding said opening and welded to said wall whereby the pressure within said cap results in a tensile stress on the welded joint with substantially no bending stress.

3. In a stay bolt connection for a boiler, the combination of a boiler plate having a depressed seat for the head of the stay bolt and a bolt opening at the bottom of the depression, a housing welded to the plate around the depression, and a screw cap for closing said housing.

4. In a stay bolt connection for a boiler, the combination of a boiler plate having a depressed seat for the head of the stay bolt, and a bolt opening at the bottom of the depression, a sleeve welded to said plate around the depressed seat, and a screw cap closing the outer end of the sleeve.

5. In a stay bolt connection for a boiler, the combination of a boiler plate having a depressed seat for the head of the stay bolt, and a bolt opening at the bottom of the depression, a housing welded to said plate around the depression and open for the passage of the bolt, a bolt, the head of which is seated in said depression, and a screw cap closing the opening in the housing.

6. The combination with an outer and an inner sheet, of a stay bolt passing through alined openings in said sheets, said stay bolt having an enlarged head which, with the walls of the adjacent opening, forms a ball and socket joint, and a cap inclosing said head and butt-welded to said outer sheet, said cap having a removable portion providing access to said bolt.

7. The combination with an outer and an inner sheet, of a stay bolt passing through alined openings in said sheets, said stay bolt having an enlarged head which, with the walls of the adjacent opening, forms a ball and socket joint, the opening in said outer sheet being only slightly larger than said stay bolt to permit a limited movement of the latter without weakening the adjacent wall, and a cap inclosing said head and welded to said outer sheet whereby the pressure within said cap results in a tensile stress on the welded joint with substantially no bending stress.

8. In a stay bolt construction, the combination with a boiler wall having an opening therein, of a cap having a continuous wall in contact with said boiler wall, surrounding said opening and welded to said boiler wall whereby the pressure within said cap results in a tensile stress on the welded joint with substantially no bending stress, and a stay bolt passing through said opening with its head seated within the inclosure formed by said cap and said boiler wall.

9. The combination with a boiler wall having an opening therein, of a circular member surrounding said opening and welded to said wall, and means for closing the outer end of said circular member.

10. In a device of the class described, a boiler wall having an opening therein, a member having a continuous wall around said opening and welded to said boiler wall, said member having a screw-threaded opening in alinement with said first opening and a screw-threaded member closing said opening.

11. In a device of the class described, a boiler wall having an opening therein, a member having a continuous wall in contact with and welded to said boiler wall, said member having an opening in alinement with said first opening and a cap closing said opening whereby the pressure within the inclosure thus formed results in a tensile stress on the welded joint with substantially no bending stress.

12. In a stay bolt construction, the combination with a boiler wall having an opening therein, of a cap having a continuous wall in contact with and welded to said boiler wall whereby the pressure within said cap results in a tensile stress on the welded joint with substantially no bending stress, and a stay bolt having a head seated within said cap.

13. In a stay bolt connection for a boiler, the combination of a boiler plate having a depressed seat for the head of the stay bolt, and a bolt opening at the bottom of the depression, a housing welded to said plate around the depression and open to render the bolt head accessible, a bolt, the head of which is seated in said depression, and means for closing the opening in the housing.

In testimony whereof I affix my signature in presence of two witnesses.

ROBERT S. MENNIE.

Witnesses:
S. J. LEHRER,
H. G. BATCHELOR.

Copies of this patent may be obtained for five cents each, by addressing the "Commissioner of Patents, Washington, D. C."